(12) United States Patent
Rees et al.

(10) Patent No.: US 8,889,795 B2
(45) Date of Patent: Nov. 18, 2014

(54) MOLECULARLY IMPRINTED POLYMERS SELECTIVE FOR TOBACCO SPECIFIC NITROSAMINES AND METHODS OF USING SAME

(71) Applicant: British American Tobacco (Investments) Limited, London (GB)

(72) Inventors: Anthony Rees, Furulund (SE); Johan Billing, Lund (SE); Ecevit Yilmaz, Bjarred (SE)

(73) Assignee: British American Tobacco (Investments) Limited, London (GB)

( * ) Notice: Subject to any disclaimer, the term of this patent is extended or adjusted under 35 U.S.C. 154(b) by 0 days.

(21) Appl. No.: 14/175,885

(22) Filed: Feb. 7, 2014

(65) Prior Publication Data

US 2014/0155555 A1 Jun. 5, 2014

Related U.S. Application Data

(63) Continuation of application No. 12/518,051, filed as application No. PCT/EP2007/062781 on Nov. 26, 2007, now Pat. No. 8,733,369.

(30) Foreign Application Priority Data

Dec. 7, 2006 (SE) ...................................... 0602625

(51) Int. Cl.
| | | |
|---|---|---|
| C08F 271/02 | (2006.01) | |
| C08F 20/06 | (2006.01) | |
| C08F 118/02 | (2006.01) | |
| A24B 15/32 | (2006.01) | |
| A24B 15/24 | (2006.01) | |
| A24B 15/30 | (2006.01) | |
| A24D 3/14 | (2006.01) | |
| B01J 20/26 | (2006.01) | |
| B01D 15/38 | (2006.01) | |

(52) U.S. Cl.
CPC .............. *A24B 15/32* (2013.01); *A24B 15/245* (2013.01); *A24B 15/30* (2013.01); *A24D 3/14* (2013.01); *B01J 20/268* (2013.01); *B01D 15/3852* (2013.01)
USPC ......... 525/279; 526/317.1; 526/319; 526/346

(58) Field of Classification Search
CPC ...... A24B 15/245; A24B 15/30; A24B 15/32; B01J 20/268; B01D 15/3852; A24D 3/14
USPC ........................ 525/279; 526/317.1, 319, 346
See application file for complete search history.

(56) References Cited

U.S. PATENT DOCUMENTS

| 5,601,097 A | 2/1997 | De Grandpre et al. |
| 8,252,876 B2 | 8/2012 | Yilmaz et al. |
| 2007/0186940 A1 | 8/2007 | Bhattacharyya et al. |

FOREIGN PATENT DOCUMENTS

| WO | 01/65954 A1 | 9/2001 |
| WO | 2005112670 A | 12/2005 |
| WO | 2006067431 A1 | 6/2006 |

OTHER PUBLICATIONS

Xia Yang, et al., "Analysis of the tobacco-specific nitrosamine . . . " Anal. Chem., Amer. Chem. Soc., vol. 77, No. 23, Dec. 1, 2005, pp. 7639-7645.*
Australian Office Action, dated Aug. 19, 2010, for Australian Patent Application 2007329060, filed Nov. 26, 2007. [Previously cited by or submitted to USPTO in U.S. Appl. No. 12/518,051, filed Nov. 5, 2010].
International Search Report and Written Opinion, mailed Jul. 25, 2008, for International Patent Application No. PCT/EP2007/062781, filed Nov. 26, 2007. [Previously cited by or submitted to USPTO in U.S. Appl. No. 12/518,051, filed Nov. 5, 2010].
International Preliminary Report on Patentability, dated Jun. 10, 2009, for International Patent Application No. PCT/EP2007/062781, filed Nov. 26, 2007. [Previously cited by or submitted to USPTO in U.S. Appl. No. 12/518,051, filed Nov. 5, 2010].
Xia Yang, et al., "Analysis of the tobacco-specific nitrosamine . . . " Anal. Chem., Amer. Chem. Soc., vol. 77, No. 23, Dec. 1, 2005, pp. 7639-7645. [Previously cited by or submitted to USPTO in U.S. Appl. No. 12/518,051, filed Nov. 5, 2010].
Liu, Y., et al., "Molecularly Imprinted Solid-Phase Extraction Sorbent for Removal of Nicotine from Tobacco Smoke," Anal. Letters, col. 36, No. 8, Jan. 1, 2003, pp. 1631-1645. [Previously cited by or submitted to USPTO in U.S. Appl. No. 12/518,051, filed Nov. 5, 2010].
Notice of Acceptance from Australian Patent Office, dated May 9, 2011, for Australian Patent Applicaton 2007329060, filed Nov. 26, 2007. [Previously cited by or submitted to USPTO in U.S. Appl. No. 12/518,051, filed Nov. 5, 2010].
Notice of Acceptance from Australian Patent Office, dated May 9, 2011, for Australian Patent Application 2007329060, filed Nov. 26, 2007.

* cited by examiner

*Primary Examiner* — William Cheung
(74) *Attorney, Agent, or Firm* — N W Poulsen; LA Pinol

(57) ABSTRACT

A class of molecularly imprinted polymers that specifically recognizes and binds to TSNAs are useful, for example, in analysis and separation of TSNAs from biological fluids. Such polymers are also useful in methods of treating and manufacturing tobacco products and materials.

17 Claims, 16 Drawing Sheets

FIGURE 4
Figure 4A
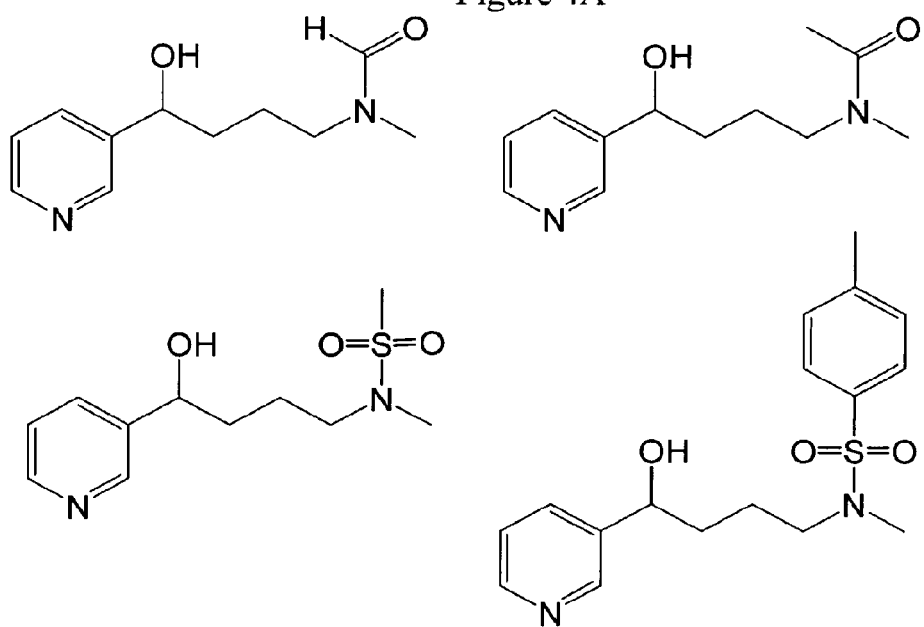
Figure 4B
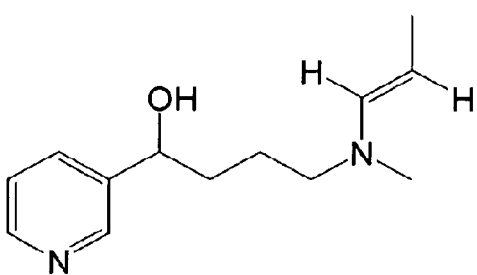

2-Hydroxy methacrylate
(HEMA)

Ethylene glycol dimethacrylate
(EDMA)

MOLECULARLY IMPRINTED POLYMERS SELECTIVE FOR TOBACCO SPECIFIC NITROSAMINES AND METHODS OF USING SAME

This application is a continuation of U.S. patent application Ser. No. 12/518,051, filed Nov. 5, 2010, which is the National Stage of International Application No. PCT/EP2007/062781, titled "Molecularly Imprinted Polymers Selective for Tobacco Specific Nitrosamines and Methods of Using the Same," filed Nov. 26, 2007, which in turn claims priority to Swedish Patent Application Number SE0602625-6, filed Dec. 7, 2006. The entire contents of the aforementioned applications are herein expressly incorporated by reference.

FIELD OF THE INVENTION

Generally, the present invention relates to molecularly imprinted polymers and use of the polymers in bioanalysis and separation of nicotine metabolites. More specifically, the invention relates to molecularly imprinted polymers having specificity for tobacco specific nitrosamines and includes methods of using the polymers to treat tobacco, tobacco substitutes, and their derivatives to reduce the level of targeted compounds therein.

BACKGROUND OF THE INVENTION

In the fields of medical, dietary, environmental and chemical sciences there is an increasing need for the selective separation of specific substances from complex mixtures of related substances. The aim can be the quantitative extraction of a certain compound or compounds, the measurement of their concentration or the selective removal of a target compound from a multi-component mixture.

Stricter health controls have increased the demand for methods allowing sensitive and selective quantification of hazardous products and metabolites from certain everyday substances in widespread use. Of particular concern are chemical compounds related to use of tobacco-based products, which compounds are either originally present in the raw tobacco leaf itself or generated during the smoking process. Nitroso-containing compounds, such as nitrosamines, are regarded as being of special significance in this regard.

With the aim of reducing the occurrence of hazards related to smoking, certain pharmaceutical products have been produced containing only the neuroactive substance, nicotine, the chemical claimed to be responsible for the dependence aspects of smokable material.

Among the nicotine formulations for smoking cessation therapy, nicotine chewing gum has found the most widespread use. The quality control required during production includes monitoring of nicotine levels as well as monitoring of the primary nicotine oxidation products cotinine, myosmine, nicotine-cis-N-oxide, nicotine-trans-N-oxide and beta-nicotyrine. Quantitation of nornicotine, anatabine and anabasine is also desirable, if not required. Improved methods and materials for such monitoring and quantitation are needed in the art. Use of such cigarette substitutes can cause nitrosamine nicotine metabolites to be produced in vivo by natural metabolic processes during the residence of the nicotine within body tissues. The levels of these metabolites remain below the concentrations at which most analytical procedures can perform quantitatively. So in addition to methods and materials for use during product manufacture, there remains a need for improved ways to monitor the low levels of nicotine metabolites in vivo.

Along with the needs felt in relation to newer products, traditional tobacco products also require methods and materials for quantifying, reducing or removing components from tobacco or tobacco smoke. Such components include tobacco specific nitrosamines (TSNAs) and their alkaloid precursors: 4-(methylnitrosamino)-1-(3-pyridyl)-1-butanone ("NNK"), 4-(methylnitrosamino)-4-(3-pyridyl)butanal ("NNA"), N-nitrosonornicotine ("NNN"), N-nitrosoanabasine ("NAB"), N-nitrosoanatabine ("NAT"), 4-(methylnitrosamino)-1-(3-pyridyl)-1-butanol ("NNAL"), 4-(methylnitrosamino)-4-(3-pyridyl)-1-butanol ("iso-NNAL"), and 4-(methylnitrosamino)-4-(3-pyridyl)butanoic acid ("iso-NNAC").

To properly quantify the amount of such compounds present in human biological fluids, methods are being developed to analyse the alkaloids, especially the nitrosylated decomposition products and metabolites in tobacco. Existing chromatographic separation or extraction methods used for this analysis lack the robustness, sensitivity and speed required in order to handle the large number of samples generated when screening the general population. With existing methods, the low concentration of nitrosamines, typically present in picograms per milliliter, demands extensive sample preparation with multi-step extractions and often chemical derivatization (for example deuteration prior to mass spectrometry) of the analyte prior to analysis. One reason for this complexity is that existing separation materials are not selective as, for example, an antibody or biological receptor might be for the metabolites in question but rather rely on physicochemical properties like charge or hydrophobicity of the metabolites for the separation behaviour. These physicochemical properties may be shared by many other irrelevant molecules in the sample. A quick and simple method for the analysis of TSNAs is therefore a significant unmet medical analytical need.

During recent years numerous reports of selective recognition of small molecules with materials prepared by molecular imprinting (molecularly imprinted polymers or MIPs) have appeared. MIPs are polymers having reactive sites adapted to bind selectively with targeted compounds. Non-covalently prepared molecularly imprinted materials have been used for chiral recognition of a variety of small molecules including therapeutic drugs, sugars, nucleotide bases, and pesticides as well as steroid and peptide hormones. The high affinity and selectivity for the target analyte exhibited by some of the imprinted materials have justified a comparison with the corresponding immuno-affinity (IA) phases. In contrast to the latter phases however, the MIP materials are straightforward to prepare, stable in most media and reusable over long periods of time. Applications of the MIP materials in chromatography, separation (continuous or batch), chemical sensing or in specific assays are therefore under investigation.

Another application is solid-phase extraction (SPE) of analytes present in low concentrations in biological samples, or in complex matrices. SPE may lead to selective enrichment and clean-up of an analyte to levels not achievable with existing methods. Molecularly imprinted solid phase extractions (MISPE) have been used in bioanalysis, food analysis and environmental analysis. In these examples selective enrichment and clean-up of the analyte is obtained resulting in higher accuracy and a lowering of the detection limit (LOD) in the subsequent chromatographic (eg HPLC) or mass spectrometric quantification.

In view of their high selectivity combined with good affinity for the target molecule or a group of target molecules, MIPs have attracted considerable interest from the food industry as a tool to improve food quality. This requires the use of a MIP for selective removal of undesirable components from the food matrix. Since these components are often present in low concentrations, the saturation capacity of the MIP is typically not a limiting factor.

According to WO 05/112670, which is specifically incorporated by reference herein, it can be preferred to have MIP material capable of selectively absorbing the most common nitrosylated nicotine derivatives from complex matrices such as urine, giving quantitative recovery and thereby leading to low errors in the estimation of chemical concentrations. The examples of WO 05/112670 are limited to MIPs prepared using acidic or highly acidic template monomers such as methacrylic acid (MAA), trifluoromethacrylic acid (TF-MAA), 4-vinylbenzoic acid, and 4-vinyl benzene sulphonic acid. In addition to quantification it is also well known to attempt to reduce the harmful effects of consuming material containing tobacco, tobacco substitutes or mixtures thereof by reducing the levels of targeted compounds. Such reductions can be made in the material itself or in a derivative thereof such as an extract of the material. Reduction can also be effected in the thermal decomposition products of the material, i.e. mainstream and sidestream smoke obtained by combustion, or the aerosols produced by heating the material to a temperature below its combustion temperature. One well known method for this sort of reduction is to contact the thermal decomposition products of the material with a filter that adsorbs undesired components therefrom. An alternative method involves solvent extraction of the material, for example as disclosed in the US patent specification U.S. Pat. No. 5,601,097. According to that specification, the protein content of tobacco material is reduced by treating the tobacco with a solution containing a surfactant to extract polypeptides, separating the solution, removing the surfactant and the polypeptides from the solution, and recombining the solution with the tobacco material. International patent specification WO 01/65954 discloses a process in which tobacco is contacted with a supercritical extraction fluid such as supercritical carbon dioxide to selectively reduce or eliminate nitrosamines.

These processes are equally applicable to both tobacco itself and to tobacco substitutes, i.e., natural or synthetic materials having similar characteristics to natural tobacco that enable them to be consumed in a similar way to tobacco, whether by smoking, chewing, inhaling or otherwise.

There has been an attempt to remove nicotine from tobacco smoke using MIPs, as reported in Liu, Y., et al., Molecularly imprinted Solid-Phase Extraction Sorbent for Removal of Nicotine from Tobacco Smoke, Analytical Letters, Vol. 36, No. 8, pp 1631-1645 (2003). The MIP described in the article was designed to bind nicotine and not the more toxic nicotine metabolites such as nitrosamines. It is unclear if the MIP was in fact selective for nicotine as the scientific method producing the data was lacking in key control-checking elements. As described in WO 05/112670, MIPs selective for TSNAs can be used to treat tobacco products and thereby reduce the levels of one or more nitroso-containing compounds from the tobacco product. Such MIPs further find use in the analysis and quantification of TSNAs in vivo, commonly in relation to consumption of tobacco products, and in the preparation and evaluation of non-tobacco products. So despite advances there remains a need in the art for novel MIPs and methods of employing the same in the field of nicotine and nicotine metabolites.

SUMMARY OF THE INVENTION

The present invention meets the needs in the art by providing unique MIPs which are particularly selective for nitroso-containing compounds.

MIPs of the invention can be obtained by co-polymerising a neutral functional monomer or monomers and a hydrophobic cross-linker in the presence of a structural analogue of a nitrosamine, in a polymerization medium containing a free radical initiator, after which the template is removed from the MIP.

The invention includes the use of the MIPs for analytical and preparative extractions, in chromatography, for analytical sample pre-treatment, in chemical sensors or as a solid phase filter for extraction of TSNAs from nicotine-containing substances or devices.

According to one embodiment, a molecularly imprinted polymer selective for at least one tobacco specific nitrosamine (TSNA) is provided, the polymer having been prepared using materials comprising a TSNA or a structural analogue thereof, a neutral functional monomer, and a hydrophobic cross-linker. The structural analogue of a TSNA could be an enamine analogue of a TSNA or a sulfonamide analogue of a TSNA or an amide analogue of a TSNA, e.g. a formamide analogue of a TSNA. The neutral functional monomer could be selected from the group consisting of 2-hydroxyethylmethacrylate (HEMA), acrylamide, methacrylamide, glycerol monoacrylate, and glycerol monomethacrylate. The hydrophobic cross-linker could be selected from the group consisting of ethylene glycol dimethacrylate (EDMA), trimethylolpropane trimethacrylate (TRIM), and divinylbenzene (DVB). In the embodiment of the invention, the polymer could be selective for NNK, NNA, NNN, NAB, NAT, NNAL, iso-NNAL, or iso-NNAC.

According to a further embodiment of the invention, a smoking article is provided, comprising a smoking material and a molecularly imprinted polymer according to the embodiment described above.

According to a further embodiment of the invention, a smoke filter can comprise a molecularly imprinted polymer according to the above.

According to a further embodiment of the invention, a kit can comprise a molecularly imprinted polymer according to the above and instructions for using the molecularly imprinted polymer to perform at least one of detecting, quantifying, and separating nitrosamines in a sample.

According to a further embodiment of the invention, a method of preparing a molecularly imprinted polymer selective for TSNAs is provided, comprising co-polymerizing at least one neutral functional monomer and at least one hydrophobic cross-linker in the presence of at least one TSNA structural analogue in a polymerization medium containing at least one free radical initiator to produce a molecularly imprinted polymer bound to a TSNA structural analogue and removing the TSNA structural analogue from the molecularly imprinted polymer.

According to a further embodiment of the invention, a method of reducing the level of at least one TSNA in a tobacco product is provided, comprising treating the tobacco product with a molecularly imprinted polymer according to the invention. The tobacco product could be produced by the thermal decomposition of a material containing tobacco, a tobacco substitute or a mixture thereof, for example, by heating the material to a temperature below its combustion temperature, by combustion of the material, or by contacting a material containing tobacco, a tobacco substitute or a mixture thereof with a solvent.

According to a further embodiment of the invention a method of manufacturing a tobacco material is provided, comprising the steps of treating a material containing tobacco, tobacco substitute or a mixture thereof with a solvent to produce an extract, contacting the extract with a molecularly imprinted polymer according to the invention so as to reduce the level thereof in the extract, and combining the treated extract with the extracted tobacco material.

In this specification, "tobacco product" means a material containing tobacco (including tobacco leaf or tobacco stem), or a tobacco substitute, or a blend of tobacco and tobacco substitutes, and derivatives of such material, including extracts of the material, smoke produced by thermal decomposition of the material and aerosols produced by heating the material to below its combustion temperature.

Where the tobacco product is a derivative produced by the thermal decomposition of material containing tobacco or a tobacco substitute, the decomposition may be effected by combustion of the material, as in a conventional cigarette, or by heating the material to a temperature below its combustion temperature, in accordance with a process used in some known alternative tobacco products in order to produce an aerosol that is inhaled by the consumer.

Alternatively, the tobacco product may be a derivative produced by contacting material containing tobacco or a tobacco substitute with a solvent. In particular, the invention provides a method of manufacturing a material for smoking comprising the steps of extracting smokable material with a solvent, treating the extract with a MIP selective for at least one nitroso-compound to reduce the level thereof in the extract and combining the treated extract with the smokable material.

In this process, the smokable material may be in any convenient form, for example fines, stems, scraps, cut lamina, shredded stems, or any combination thereof. The solvent may be aqueous or non-aqueous, such as methanol, ethanol or a super-critical fluid extraction medium, such as super-critical carbon dioxide liquid. The extraction may be carried out under any conditions favoring the extraction of nitrogen-containing compounds from tobacco.

The invention also includes a smoking article comprising tobacco or tobacco substitute and a MIP selective for the removal of at least one nitroso-containing compound from the thermal decomposition product thereof.

The smoking article of the invention may take any conventional form, for example a cigarette, cigar or cigarillo. In particular the smoking article may comprise a rod of smoking material optionally in a wrapper, with or without a filter. The wrapper may be of paper, tobacco leaf, reconstituted tobacco or a tobacco substitute. Alternatively, where, for example, the smoking article is intended to produce low emissions of sidestream smoke, or lower levels of pyrolysis products in the mainstream smoke, the wrapper may be composed of non-combustible inorganic material such as a ceramic material. The filter may be of any suitable material, for example fibrous cellulose acetate, polypropylene or polyethylene, or paper.

The smoking material is preferably tobacco but may be a tobacco substitute such as non-tobacco smoking material. Examples of non-tobacco smoking materials are dried and cured vegetable material, including fruit materials, and a synthetic smoking material such as may be produced from alginates and an aerosol-generating substance such as glycerol. The smoking material may also comprise a blend of tobacco and non-tobacco smoking materials. Where the smoking material comprises tobacco, the tobacco may be of any suitable type, or a blend thereof, including air-cured, fire-cured, flue-cured, or sun-cured lamina or stem, and may have been processed using any appropriate process. For example, the tobacco may be cut, shredded, expanded or reconstituted. The smoking material may also include conventional additives, such as ameliorants, colorants, humectants (such as glycerol and propylene glycol), inert fillers (such as chalk), and flavourings (such as sugar, liquorice and cocoa).

The invention may also be applied to tobacco that is intended for oral or nasal consumption by sucking, chewing, or nasal ingestion, rather than smoking. Such products include snuff, snus, and chewing tobacco.

The MIP may be incorporated in the smokable material. Accordingly, the invention includes smoking material containing a MIP selective for the removal of at least one tobacco specific nitrosamine from the thermal decomposition products of the smokable material. Alternatively, where the smoking article comprises a rod of smokable material in a wrapper, the MIP may be incorporated in the wrapper. The invention therefore includes wrapper material for smoking articles comprising a molecularly-imprinted polymer selective for the removal of a targeted component from the thermal decomposition products of a smoking material. The wrapper may be a cellulose-based material such as a paper or a tobacco based material such as reconstituted tobacco.

The preferred smoking articles of the invention are cigarettes, comprising a rod of tobacco, wrapper, and a filter including a MIP selective for the removal of at least one tobacco specific nitrosamine from the thermal decomposition products of a smokable material.

The invention also includes a smoke filter comprising a MIP selective for the removal of at least one tobacco specific nitrosamine from the thermal decomposition products of a smoking material. The smoke filter may be produced separately from the smoking article, for example in the form of a cigarette or cigar holder, or it may be integrated into the smoking article, for example in the form of a cigarette with a filter tip.

Smoke filters in the form of filter tips may be of any conventional construction. For example a "dalmatian" type filter comprising a section of fibrous filter material, such as cellulose acetate, the MIP being in particulate form and distributed throughout the section. Alternatively the filter may be in the form of a "cavity" type filter, comprising multiple sections wherein the MIP may lie between two adjacent sections of fibrous filter material. The smoke filter may also comprise other adsorbent materials such as an ion-exchange resin, a zeolite, silica, alumina or amberlite.

In use, the smoke passes through the filter, the MIP selectively adsorbs and retains the targeted compounds from the smoke and the filtered smoke is delivered to the smoker.

The smoke filters and smoking articles according to the invention may include means for protecting the MIP from, or reducing its exposure to, smoke when in use. This may be achieved in a number of different ways. For example the smoke filter may comprise a filter element for adsorbing materials from the vapour or particulate phase of smoke. Such filter elements may comprise a general adsorbent such as activated carbon, which may be in any convenient form, such as threads, particles, granules, cloth, or paper. The filter element may also be a selective adsorbent such as an ion-exchange resin, a zeolite, silica, alumina or amberlite. The means for protecting the MIP may include two or more such filter elements of different compositions, for example a first filter element of cellulose acetate, and a second filter element of activated carbon. The provision of multiple filter elements in smoke filters and smoking articles is well known, and any conventional configuration of filter, and associated methods of construction, may be used.

BRIEF DESCRIPTION OF THE DRAWINGS

FIG. 4A shows examples of amide and sulfonamide based target analogs;

FIG. 4B shows an enamine target analogue (MPAPB) used as a template to prepare a MIP for extraction of NNAL;

In the drawings, similar features are given like reference numerals.

DETAILED DESCRIPTION OF THE INVENTION

Molecular imprinting typically consists of the following steps: (1) a template compound, which may be the targeted molecule or a structural analogue thereof, is allowed to interact with a selected functional monomer, or monomers, in solution to form a template-monomer complex; (2) the template-monomer complex is co-polymerized with a cross-linking monomer resulting in a polymeric matrix incorporating the template compound; (3) the template compound is extracted from the polymer matrix to form a MIP that can be used for selective binding of the targeted molecule.

Prior to step (3), where the MIP is prepared as a solid polymer (or monolith) it is typically crushed and sieved to obtain a desired size fraction of particulate material. When prepared by either suspension or emulsion polymerization methods, such crushing and sieving is unnecessary since the particle size can be controlled within the desired limits during the polymerization process. Particulate material prepared by any of the aforementioned methods can be packed into a chromatographic or solid phase extraction column and used for chromatographic separation of the template from other components of a mixture, including molecules with similar structures or functionalities.

The reactive sites on the molecularly imprinted polymer exposed by removal of the template compound will be in a stereo-chemical configuration appropriate for reaction with fresh molecules of the targeted molecule. As a result, the molecularly imprinted polymer can be used for selective binding of the targeted molecule.

The 'non-covalent' route has been widely used to generate molecularly imprinted binding sites. This makes use of non-covalent self-assembly of the template compound and functional monomers to form the template-monomer complex, followed by free radical polymerization in the presence of a cross-linking monomer and finally template compound extraction. Covalent imprinting, in which the template molecule and a suitable monomer or monomers are covalently bound together prior to polymerization, can also be carried out according to known methods. The binding properties of the MIPs formed by either of the above methods can be examined by re-binding of the template molecule.

The polymerization is performed in the presence of a pore-forming solvent, a porogen. In order to stabilize the electrostatic interactions between the functional monomers and the template compound the porogen is often chosen from among aprotic solvents of low to moderate polarity. Template compounds often exhibit moderate to high solubility in the polymerization media and these, or their structural analogues, can therefore be utilized directly in this standard procedure.

Figure 1:
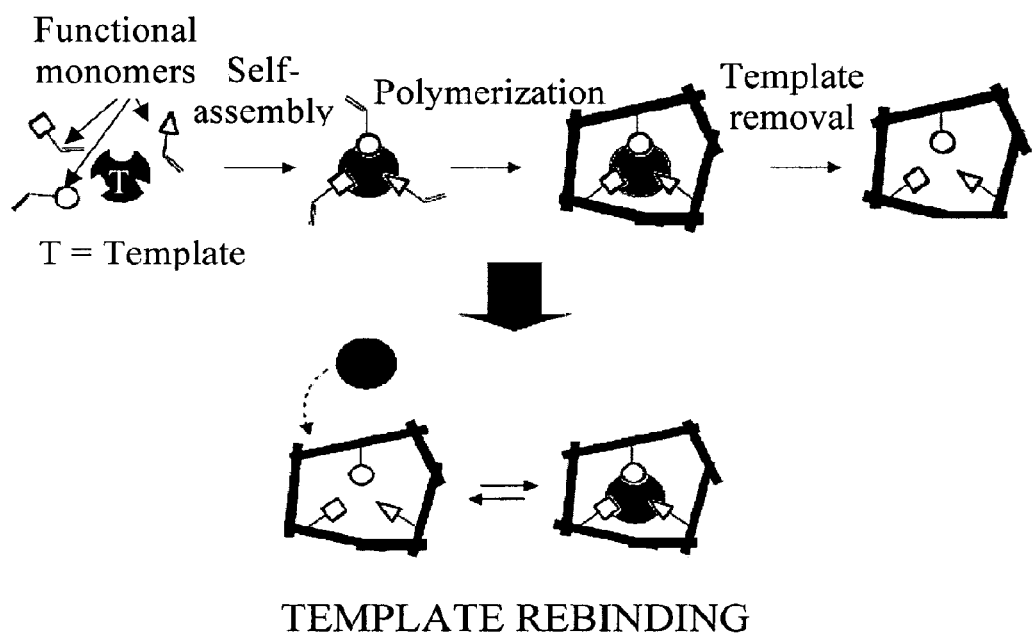
FIG. 1 shows an outline of the procedure for synthesis of an imprinted polymer.
Figure 2:
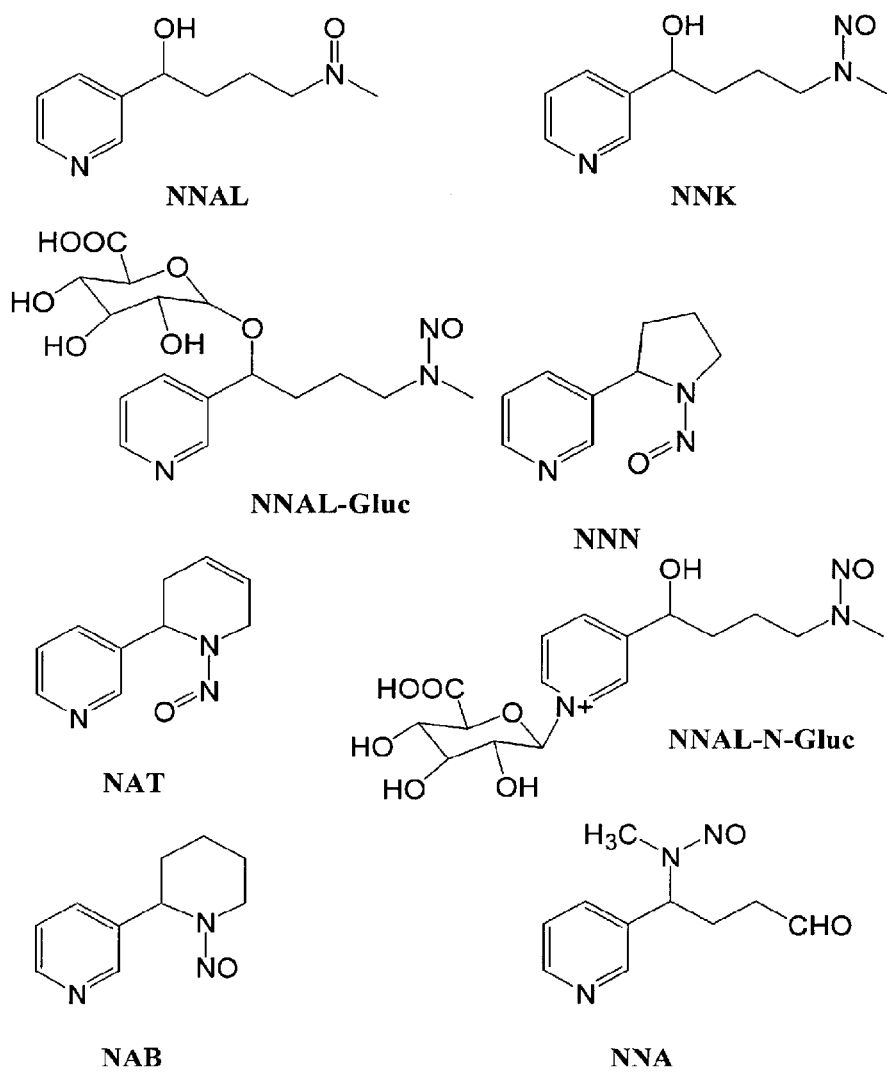
FIG. 2 shows tobacco specific nitrosamines.

While it is possible to use the targeted molecule itself as the template, a structural analog of the target molecule is commonly preferred because: (a) the targeted molecule may be unstable under the polymerization conditions or may inhibit the polymerization; (b) the targeted molecule may not be available in sufficient quantities due to complexity of its synthesis or cost, or both; (c) the template may be insoluble or poorly soluble in the pre-polymerization mixture; (d) the MIP may remain contaminated by low levels of the targeted molecule retained in poorly accessible regions of the polymer matrix, which may bleed from the MIP during use; and/or (e) the target analyte(s) may present a significant health risk and should not be used as a template(s). In the case of nitroso-compounds, particularly the compounds known as TSNAs described below, it is often more convenient to use functional analogues thereof as template compounds. For example, sulfonamide, enamine, or amide, e.g. formamide, derivatives of TSNAs can be template compounds, see FIG. 2 for examples of the same.

Where the MIP is derived using a functional analog of the targeted compound, the functional analogue should be isosteric and preferably also isoelectronic with the targeted compound, or it may contain a substructure of the targeted compound where strong interactions may be likely.

As used herein a "structural analogue" of a molecule is not identical to the original molecule, but is in part or whole similar to part or all of the original molecule in terms of molecular shape, electron distribution or other characteristics.

Nitroso-containing compounds, particularly nitrosamines, which have the general formula O=N—N($R_1$) ($R_2$) are among the numerous ingredients of tobacco and tobacco smoke that have been suggested as having a harmful effect on consumers. Of interest for the present invention is the group of nitrosamines that occur naturally in tobacco, TSNAs, see FIG. 2.

Figure 3:
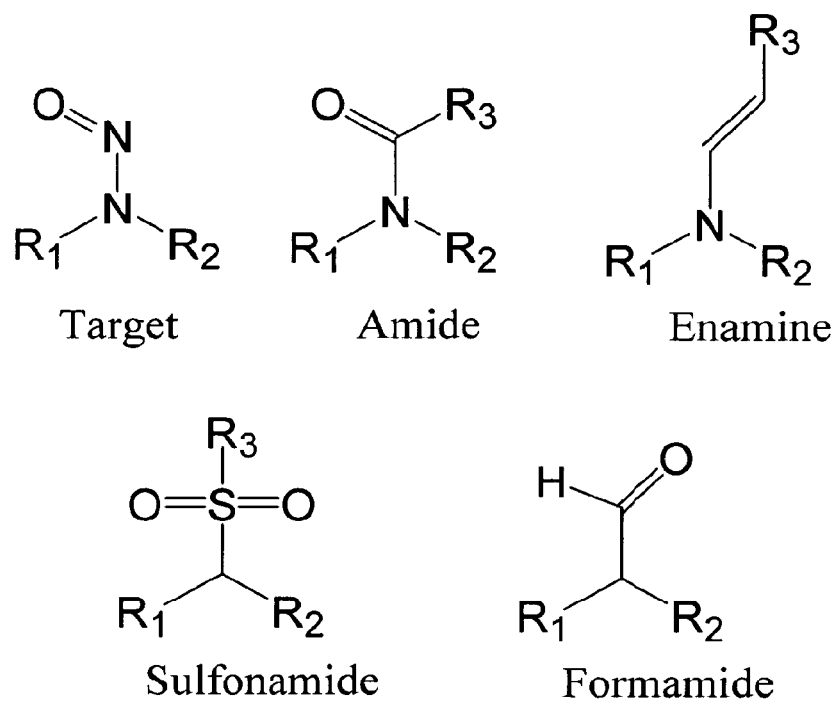
FIG. 3 shows isosteric analogues of nitrosamines.

Possible isosteric analogs for the targeting of nitrosamines are seen in FIG. 3. The molecules shown are all derivatives of the parent amine and can be synthesized in a single step from the secondary amine and corresponding aldehyde or acid chloride. Molecular models of the enamine (FIG. 4B) have shown a good steric complementarity with NNAL.

The MIPs described in WO 05/112670 show promising results when used for analysis and extraction of numerous nicotine metabolites from analytical solutions, body fluids, and tobacco materials. However, as TSNAs present a specific and narrow field of interest, investigation as to new ways to recover these compounds from various materials is ongoing. In that regard, MIP formation using new materials and methods has been evaluated.

Design of new MIPs started with choice of a suitable template. As noted above, the template imparts selectivity to the polymer and should ideally be chemically stable, readily available, easy to handle, and impart selective binding properties. As one goal of the invention is to reduce human exposure to nitrosamines they were not potential templates. Instead, formamides, enamines and sulfonamides (see FIG. 2) could be used to replace the nitroso group given their similar geometries and possession of a partial negative charge in the same position.

Figure 5:
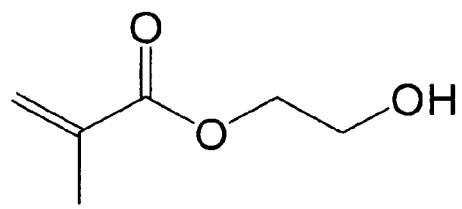
FIG. 5 shows the chemical structure of 2-hydroxyethyl methacrylate.
Figure 6:
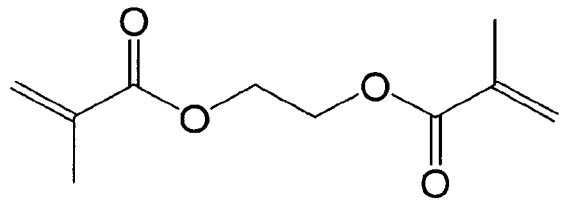
FIG. 6 shows the chemical structure of ethylene glycol dimethacrylate.

The monomer, cross-linker and polymerization conditions (e.g., solvent or porogen, initiator, and temperature) also influence properties of the final MIP. Monomers evaluated were the acidic MAA as well as the neutral monomer 2-hydroxyethylmethacrylate (HEMA), see FIG. 5. The cross-linker, which eventually makes up the bulk of the polymer, also influences whether the polymer is hydrophilic or hydrophobic. Thus the hydrophilic cross-linker PETRA and the hydrophobic EDMA were evaluated, see FIG. 6. For polymerization, both thermal and photochemical initiation were evaluated. Initial experiments indicated that neutral, hydrophobic MIPs imprinted with an enamine or sulfonamide and prepared using UV polymerization showed surprising results. Follow on analysis was conducted which included an acidic and a hydrophilic MIP for comparison, results are summarized below.

By way of explanation and not of limitation, the invention will be further described in more detail with reference to a number of examples. The invention refers to template molecules, polymer materials designed to bind TSNAs present in organic or aqueous systems, and finally use of said materials in, for example, analytical or preparative separations, in chromatography, for analytical sample pre-treatment, and in chemical sensors. Unless otherwise described, materials are commercially available or can be prepared by conventional techniques.

Example 1

Preparation of MIPs for Evaluation

Twelve different MIPs were prepared which represented all possible combinations of three templates (formamide, enamine, and sulfonamide), two monomers (acidic and neutral), and two cross-linkers (hydrophilic and hydrophobic). Using a 1:1 mixture of N-nitrosopiperidine and (−)-nicotine in water the MIPs were evaluated. Non-imprinted reference polymers were also generated and evaluated under like conditions. Results are summarized in FIG. 7. Examples of the preparation of enamine and pyridine carbinol templates as well as further description of methods which can be used for the purposes of the present invention can be found in WO 05/112670.

Figure 7:
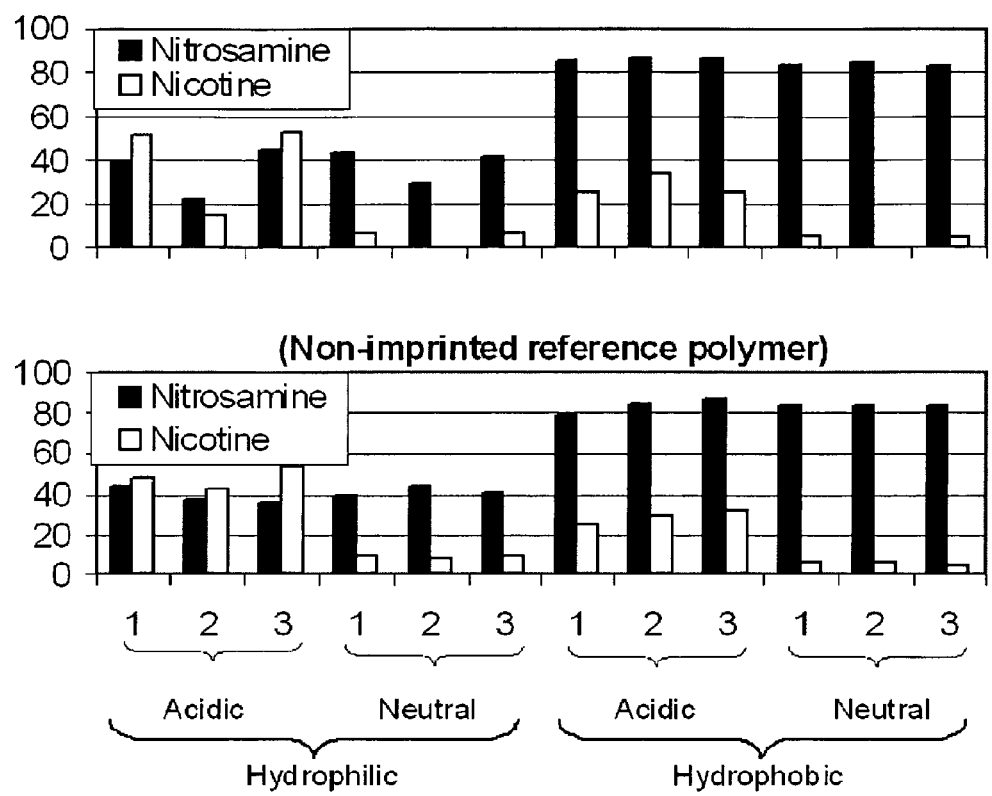
FIG. 7 shows results from extraction of N-nitrosopiperidine and nicotine where template 1 is formamide, template 2 is enamine and template 3 is sulfonamide.

As is evident from FIG. 7, MIPs using acidic monomers bind large amounts of nicotine. For applications where TSNAs are to be screened out while nicotine levels should remain unaffected, then, such a monomer is less favored. In addition, it is evident that MIPs with a hydrophobic cross-linker are better at binding nitrosamine than hydrophilic MIPs.

Example 2

Preparation of MIPs for Analytical Comparison

In view of the surprisingly positive performance of neutral, hydrophobic MIPs as summarized in FIG. 7, the neutral, hydrophobic MIPs imprinted with enamine or sulfonamide templates and polymerized using UV were selected for further analysis. For comparison, the best-performing hydrophilic MIP was also included in the sample. Seven MIPs were prepared using the parameters summarized in Table 1.

TABLE 1

| Name | Template | Monomer | Cross-Linker |
| --- | --- | --- | --- |
| MIP 1 | enamine-piperidine | HEMA | EDMA |
| MIP 2 | enamine-piperidine | PETRA | PETRA |
| MIP 3 | sulfonamide-piperidine | HEMA | EDMA |
| MIP 4 | NNAL analogue | HEMA | EDMA |
| MIP 5 | NNAL analogue | HEMA | EDMA |
| MIP 6 | pyridine-sulfonamide | HEMA | EDMA |
| MIP 7 | pyridine-enamine | HEMA | EDMA |

Example 3

Evaluation of Selected MIPs with TSNA/Nicotine Mixtures

SPE columns were prepared, each containing 25 mg of MIPs 1-7. To each column 1 ml of aqueous solution containing 0.30 µg/ml total TSNA and 0.2 µg/ml nicotine was added.

Figure 8:
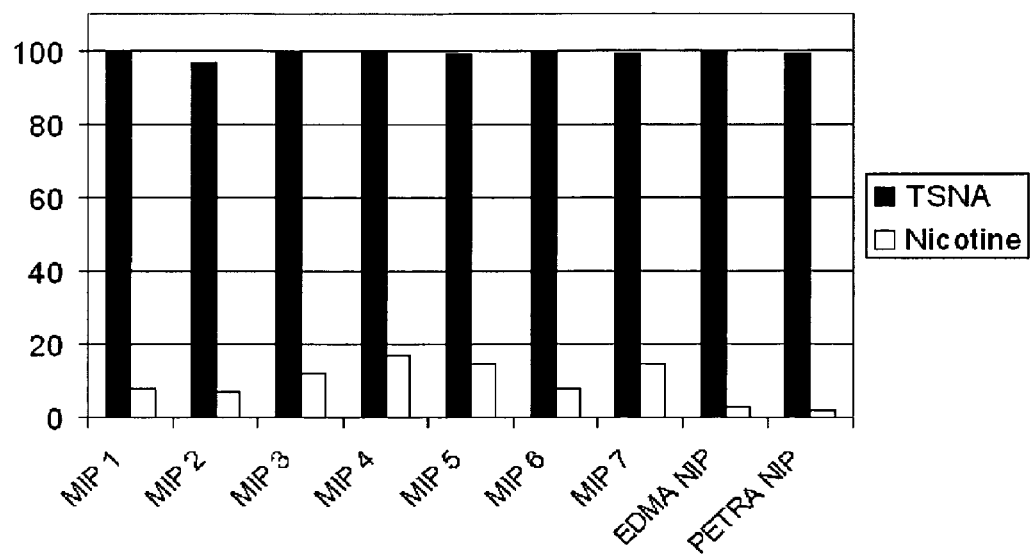
FIG. 8 shows percentage of TSNAs and nicotine extracted from aqueous solution.
Figure 9:
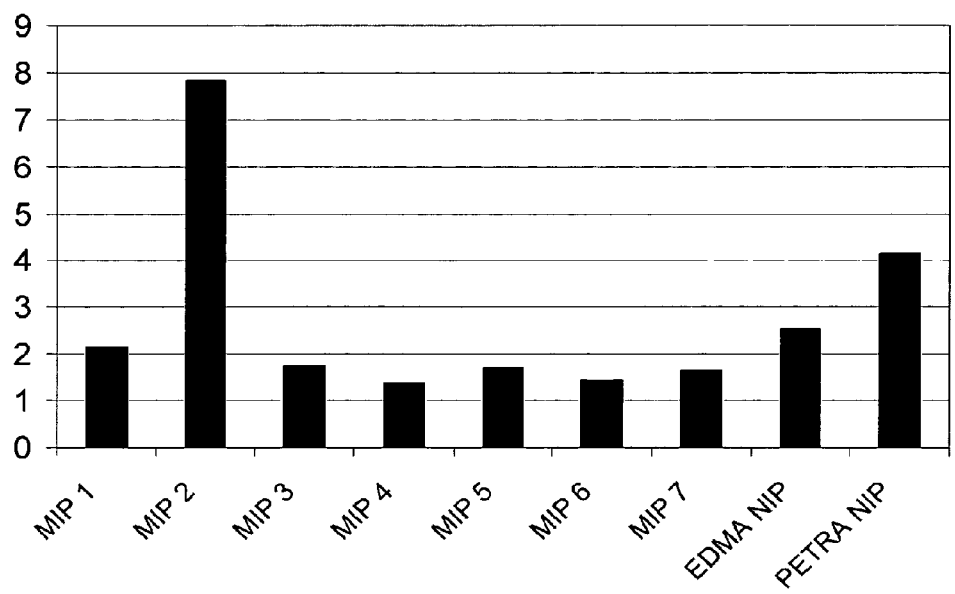
FIG. 9 shows percentage of TSNAs released upon a water wash.

HPLC was used to determine the amount of TSNA that had not been extracted in each column, allowing for calculation of the extracted material, see FIG. 8. 1 ml of water was then passed through each column and the amount of TSNA released, if any, was determined see FIG. 9. Each of FIGS. 8 and 9 represent the average of two experiments.

Figure 10:
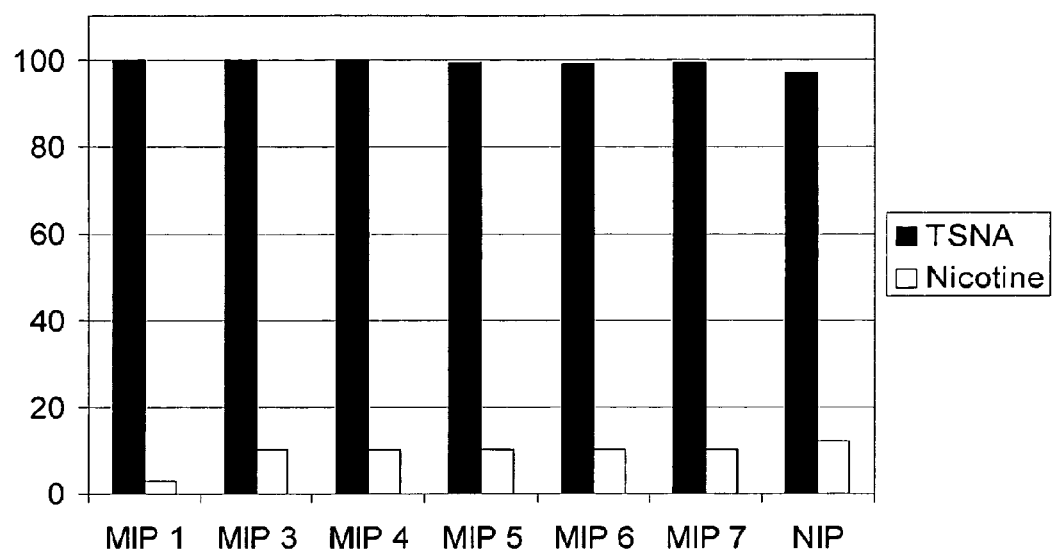
FIG. 10 shows percentage of TSNAs and nicotine extracted from aqueous solution.
Figure 11:
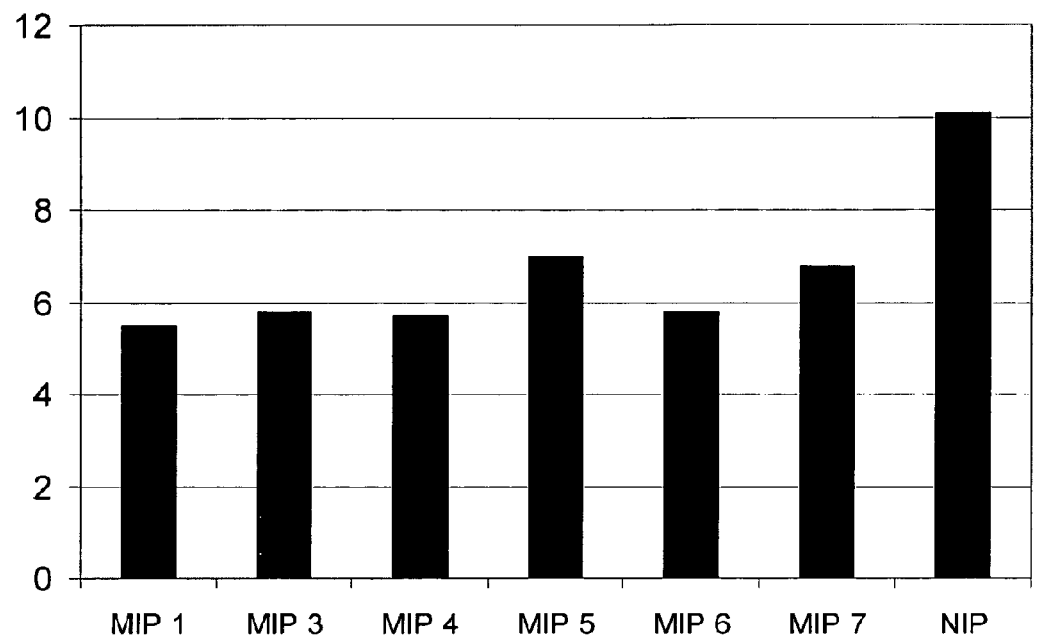
FIG. 11 shows percentage of TSNAs released upon a water wash.
Figure 12:
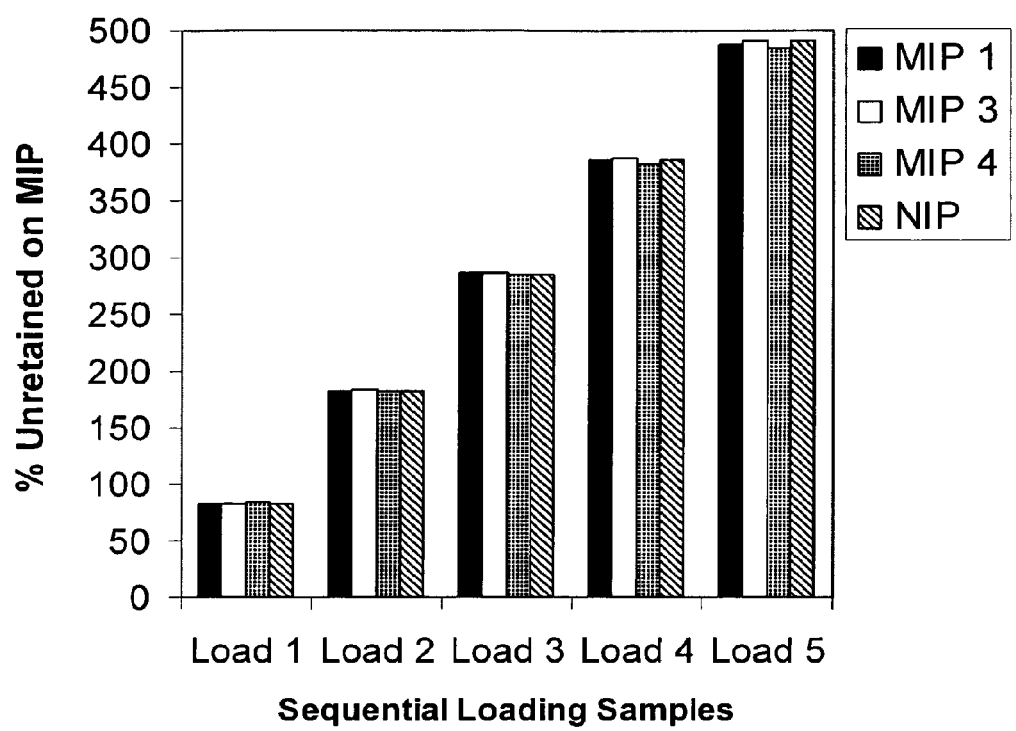
FIG. 12 shows the percentage of nicotine unretained after five separate sample loads.
Figure 13:
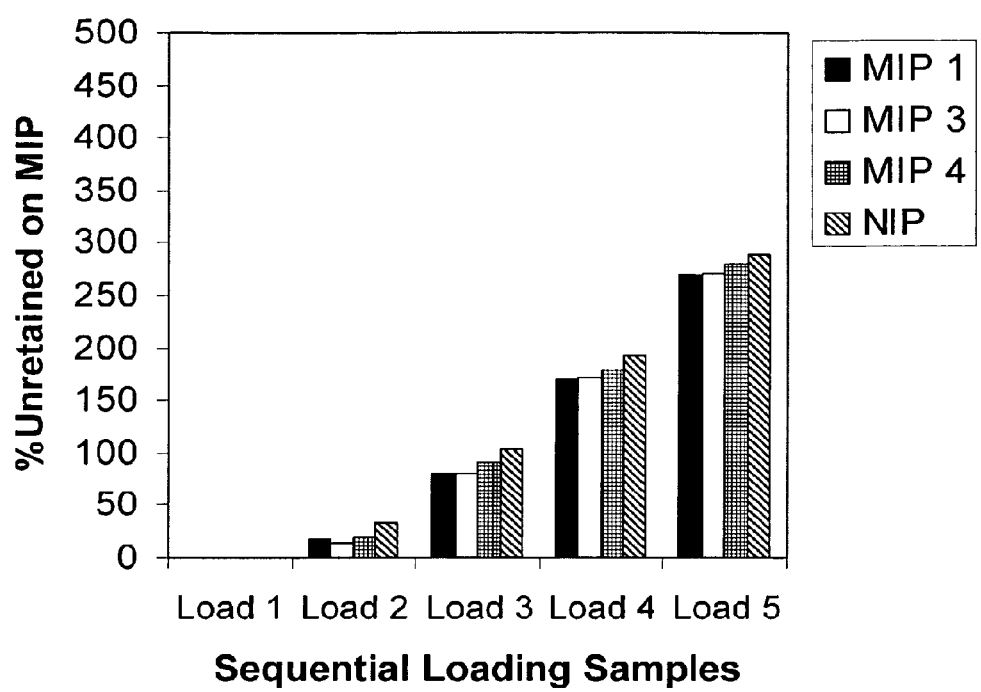
FIG. 13 shows the percentage of NNN unretained after five separate sample loads.
Figure 14:
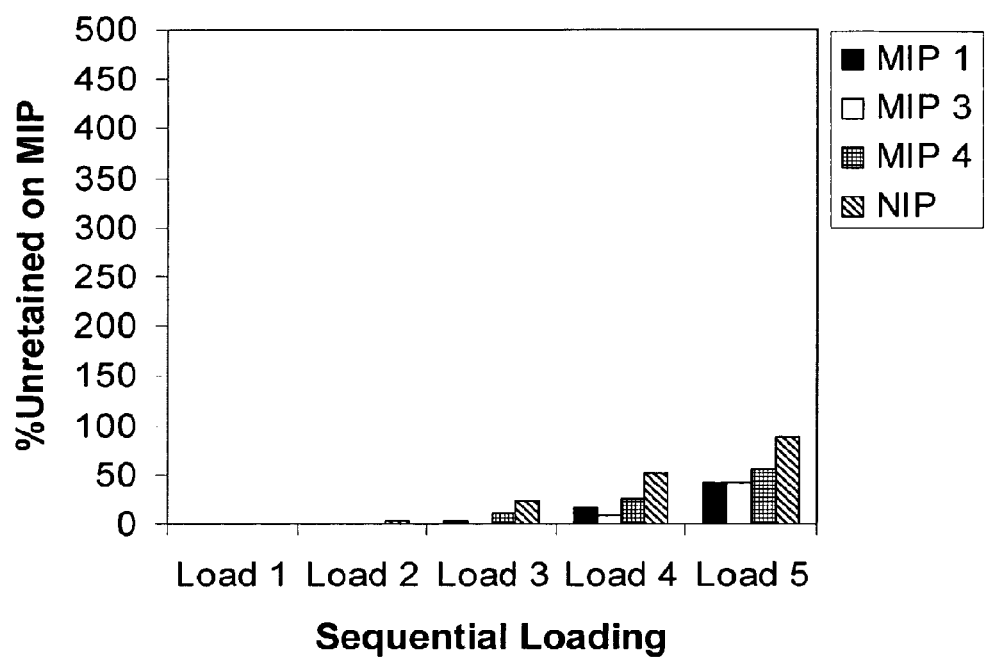
FIG. 14 shows the percentage of NNK unretained after five separate sample loads.
Figure 15:
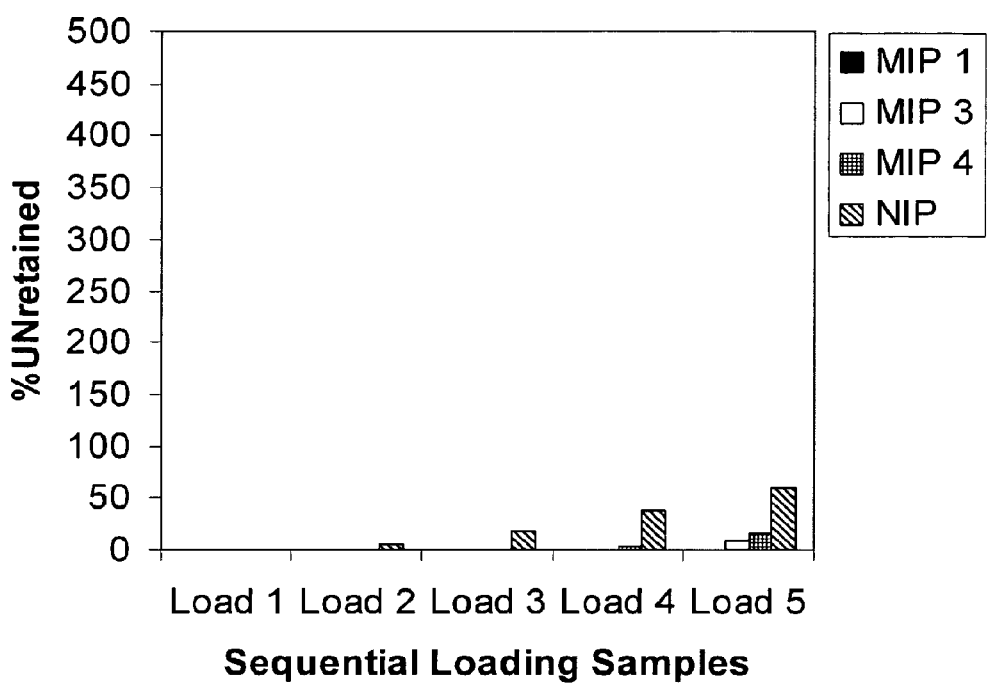
FIG. 15 shows the percentage of NAT unretained after five separate sample loads.
Figure 16:
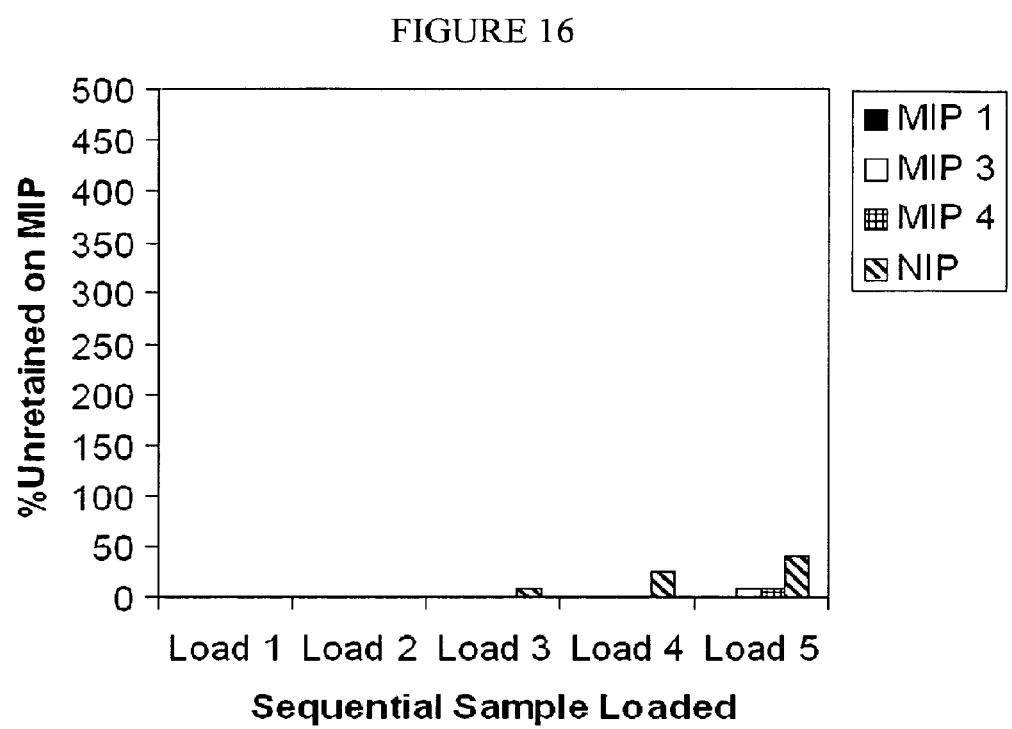
FIG. 16 shows the percentage of NAB unretained after five separate sample loads.

Based on the strong performance of the hydrophobic, neutral MIPs, the evaluation for MIPs 1 and 3-7 was repeated using 1 ml of test solution containing 0.30 µg/ml total TSNA and 4 µg/ml nicotine in pH 6.3 phosphate buffer (ionic strength 0.09). Results are shown in FIGS. 10 and 11, where both represent an average of two experiments. As can be seen, MIPs 1, 3, and 4 performed best by retaining 100% of the TSNA while allowing most of the nicotine to pass unencumbered.

The performance of MIPs 1, 3, and 4 was also evaluated at pH 5.3 and 7.3. As pH increased, retention of nicotine increased from approximately 10% to 30%, indicating that where nicotine is not to be affected, optimal performance is attained using slightly acidic pH. An acidic MIP formed using the acidic monomer MAA and the hydrophobic cross-linker EDMA was also evaluated using the same conditions at pH 6.3, it retained about 90% of the nicotine.

Regeneration of the MIPs was performed using a 0.5% TFA in MeOH wash. Other acid/alcohol mixtures may be used as well.

Example 4

Evaluation of Select MIPs with specific TSNAs and Nicotine

After finding the surprisingly positive performance of MIPs 1, 3, and 4 in the above-described experiments, a further evaluation was conducted. SPE columns were prepared with 25 mg of ground MIP and five loads of test solution at 1 ml each were loaded on the columns. The test solution was ca. 80 ng/ml each of NNN, NNK, NAT, 40 ng/ml NAB and 4 µg/ml nicotine in pH 6.3 phosphate buffer (ionic strength 0.09). After loading each sample the amount of unretained nicotine and each TSNA was determined using HPLC. A control non-imprinted polymer was also evaluated. Results are shown in FIGS. 12-16. As seen in the figures, about 10% of the nicotine is bound by the MIPs in the first loading step. This saturates the MIP with nicotine and adding more sample on the column does not result in a further significant retention of nicotine. NNN is most weakly bound to the MIP and breakthrough is seen in the second loading step. Each of MIPs 1, 3, and 4 is excellent at retaining NNK, NAB, and NAT. Thus, the combination of neutral functional monomer, enamine or sulfonamide template, and hydrophobic cross-linker results in a surprisingly high retention of TSNA from a mixed sample while retaining only a minimal amount of nicotine.

Such MIPs are particularly attractive for applications where TSNAs are to be removed from a sample but nicotine should not be affected, such as treatment of tobacco or tobacco smoke to remove TSNAs. In addition, such MIPs can be utilized in an analytical capacity to measure the amount of TSNA is a sample of a product or a sample from a patient. In such cases, if nicotine is a component of interest the amount of nicotine retained by the MIP can be quantified and other methods, for example, nicotine-specific MIPs can be used to quantify the remaining amount of nicotine in the sample. The further step of evaluating nicotine levels could be done prior or subsequent to use of the TSNA specific MIPs of the present invention.

Example 5

Use of a MIP of the Invention in the Treatment of Tobacco Extracts

The polymer produced according to the parameters described above can be incorporated into a SPE column and the column can be conditioned as necessary. Neutral functional monomers used in the polymer could be, for example, HEMA, acrylamide, methacrylamide, N-methacrylamide, glycerol monoacrylate, glycerol monomethacrylate, or 2-(4-Vinylphenyl)-1,3-propanediol. Hydrophobic cross-linkers could be, for example, EDMA, TRIM, DVB, m-diisopropenylbenzene, tetramethylene glycol dimethacrylate, pentaerythrithol tetraacrylate, N,N'-Methylenebisacrylamide, N,N'-Ethylenebisacrylamide, N,N'-Buthylenebisacrylamide, N,N'-Hexamethylenebisacrylamide. Further applicable materials are known, see, for example, *Molecularly Imprinted Material*: Science and Technology, Yan, M; Ramström, O; Eds., Marcel Dekker, New York, 2005.

Cut or shredded tobacco leaf can be extracted with water for 15-25 minutes at 60° C. The tobacco is separated from the solution by filtration and dried. The solution is passed through the SPE column and TSNA is absorbed from the extract. The column is then drained and the solution concentrated by film evaporation, the concentrate is then recombined with the extracted tobacco and dried in air. Performance of the MIP can be evaluated by eluting bound compounds from the MIP using 2×1 ml methanol containing 0.5% TFA and extract analyzed using HPLC-UV.

Example 6

Use of a MIP of the Invention in the Treatment of Tobacco Extracts

Using a continuous extraction process, US Blend-type shredded tobacco leaf is loaded into a first extraction chamber into which super-critical carbon dioxide is fed. After contacting the tobacco, the carbon dioxide is fed into a second extraction chamber containing a MIP according to the invention. Having contacted the polymer, the carbon dioxide is returned to the first extraction chamber and contacted again with the tobacco. The cyclic process is continued until the TSNA content of the tobacco has been reduced to a desired level, whereupon the carbon dioxide is vented from the system, and the tobacco removed from the first chamber. The MIP in the second chamber is then regenerated for reuse.

Example 7

Use of an MIP of the Invention for Sample Analysis

A SPE column is prepared by adding 25 mg of MIP according to the invention. A test sample is added to the column, for example 5 ml of human urine potentially containing TSNAs. The sample is allowed to pass through the column, which would then be subjected to vacuum to remove all liquid and ensure the MIP material is dry. A wash may be conducted to remove any interfering compounds that may have non-specifically associated with the MIP, for example 1 ml distilled water. After drying the TSNAs can be recovered from the MIP using, e.g., 1 ml DCM and quantified using HPLC.

Example 8

Use of an MIP of the Invention in Smoking Articles

Figure 17:
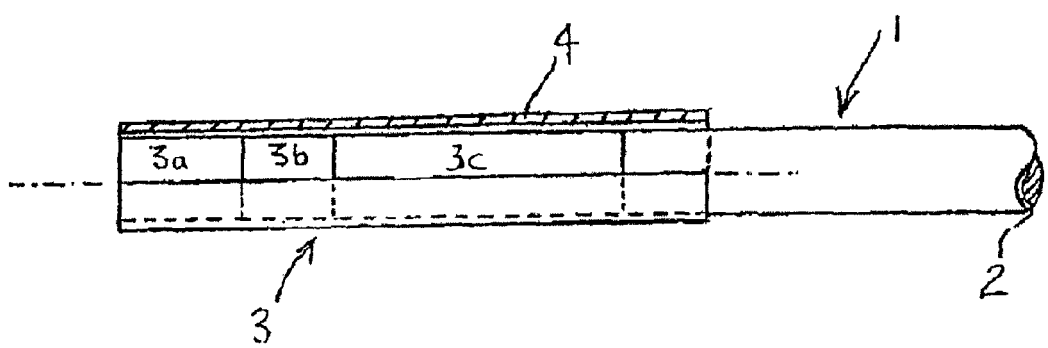
FIG. 17 is a side elevation, partly longitudinal cross-section and partially broken away view of a smoking article with a smoke filter according to the invention.
Figure 18:
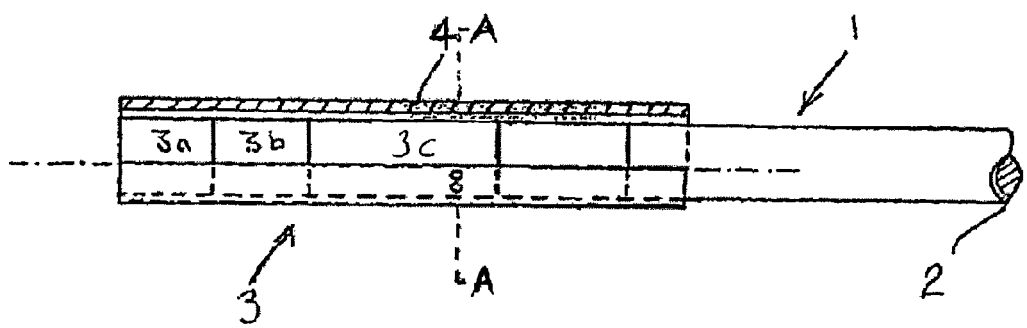
FIG. 18 is a similar view to FIG. 17 of a smoking article with an alternative smoke filter according to the invention.

Referring to the drawings, FIGS. 17 and 18 illustrate smoking articles in the form of cigarettes having a rod 1 of tobacco encased in a wrapper 2 attached to a smoke filter 3 by means of a tipping paper 4. For clarity, the tipping paper 4 is shown spaced from the wrapper 2, but in practice they lie in close contact.

In FIG. 17, the smoke filter 3 comprises three cylindrical filter elements 3a, 3 b, 3c. The first filter element 3a at the mouth end of the filter is 7 mm in length, composed of cellulose acetate tow impregnated with 7% by weight of triacetin plasticizer having a 25 mm water gauge pressure drop over its length. The second filter element 3b, positioned centrally is a cavity 5 mm in length containing 150 mg of activated carbon granules. The third filter element 3c adjacent the rod 1 is 15 mm in length, has a 90 mm water gauge pressure drop over its length, and comprises 80 mg cellulose acetate tow. The tow is impregnated with 4% by weight of triacetin and has 80 mg of MIP specific for TSNAs as described herein, distributed evenly throughout its volume in a "Dalmatian" style.

The cigarette shown in FIG. 18 is similar to that of FIG. 17 except that the smoke filter 3 has four coaxial, cylindrical filter elements 3a, 3b, 3c and 3d. The first filter element 3a at the mouth end of the cigarette is 5 mm in length, and composed of cellulose acetate tow impregnated with 7% by weight of triacetin plasticizer. The second filter element 3b, positioned adjacent the first filter element 3a is a cavity 5 mm in length containing 200 mg of MIP specific for TSNAs, produced as described herein. The third filter element 3c adjacent the second filter element 3b is 10 mm in length and comprises cellulose acetate tow impregnated with 7% by weight of triacetin. The fourth filter element 3d lies between the third filter element 3c, is 7 mm in length and comprises 80 mg of granular activated carbon. A ring of ventilation holes 5 is formed in the tipping paper 4 in a radial plane A-A which deliver air into the third filter element 3c about 3 mm downstream of the junction with the fourth filter 5 element 3d when smoke is inhaled through the cigarette.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A molecularly imprinted polymer selective for at least one tobacco specific nitrosamine (TSNA), the polymer having been prepared using materials comprising:
    a TSNA or a structural analogue thereof;
    a neutral functional monomer; and
    a hydrophobic cross-linker wherein said neutral functional monomer is selected from the group consisting of 2-hydroxyethylmethacrylate (HEMA), acrylamide, methacrylamide, glycerol monoacrylate, and glycerol monomethacrylate.

2. A polymer according to claim 1, wherein said structural analogue of a TSNA is an enamine analogue of a TSNA.

3. A polymer according to claim 1, wherein said structural analogue of a TSNA is an amide analogue of a TSNA.

4. A polymer according to claim 1, wherein said structural analogue of a TSNA is a sulfonamide analogue of a TSNA.

5. A polymer according to claim 1, wherein said hydrophobic cross-linker is selected from the group consisting of ethylene glycol dimethacrylate (EDMA), trimethylolpropane trimethacrylate (TRIM), and divinylbenzene (DVB).

6. A polymer according to claim 1, wherein the polymer is selective for NNK.

7. A polymer according to claim 1, wherein the polymer is selective for NNA.

8. A polymer according to claim 1, wherein the polymer is selective for NNN.

9. A polymer according to claim 1, wherein the polymer is selective for NAB.

10. A polymer according to claim 1, wherein the polymer is selective for NAT.

11. A polymer according to claim 1, wherein the polymer is selective for NNAL.

12. A polymer according to claim 1, wherein the polymer is selective for iso-NNAL.

13. A polymer according to claim 1, wherein the polymer is selective for iso-NNAC.

14. A kit, comprising:
    a molecularly imprinted polymer selective for at least one tobacco specific nitrosamine (TSNA), the polymer prepared using materials comprising:
        a TSNA or a structural analogue thereof;
        a neutral functional monomer; and
        a hydrophobic cross-linker; and
    instructions for using the molecularly imprinted polymer to perform at least one of detecting, quantifying, and separating nitrosamines in a sample wherein the functional monomer is selected from the group consisting of: HEMA, acrylamide, methacrylamide, glycerol monoacrylate, and glycerol monomethacrylate.

15. A method of preparing a molecularly imprinted polymer selective for TSNAs, comprising:
    co-polymerizing at least one neutral functional monomer and at least one hydrophobic cross-linker in the presence of at least one TSNA structural analogue in a polymerization medium containing at least one free radical initiator to produce a molecularly imprinted polymer bound to a TSNA structural analogue; and
    removing the TSNA structural analogue from the molecularly imprinted polymer wherein the functional monomer is selected from the group consisting of: HEMA, acrylamide, methacrylamide, glycerol monoacrylate, and glycerol monomethacrylate.

16. A method according to claim 15, wherein the cross-linker is selected from the group consisting of: EDMA, TRIM, and DVB.

17. A molecularly imprinted polymer produced by the method of claim 15.

* * * * *

UNITED STATES PATENT AND TRADEMARK OFFICE
CERTIFICATE OF CORRECTION

PATENT NO. : 8,889,795 B2
APPLICATION NO. : 14/175885
DATED : November 18, 2014
INVENTOR(S) : Anthony Rees, Johan Billing and Ecevit Yilmaz It is certified that error appears in the above-identified patent and that said Letters Patent is hereby corrected as shown below:

On the title page:

Item (30) Foreign Application Priority Data

"0602625" should read -- 0602625-6 --

Signed and Sealed this
Twenty-first Day of April, 2015

Michelle K. Lee
*Director of the United States Patent and Trademark Office*